Nov. 18, 1941.   H. E. JONES   2,262,942
NAVIGATION INSTRUMENT
Filed Feb. 28, 1938   5 Sheets-Sheet 3

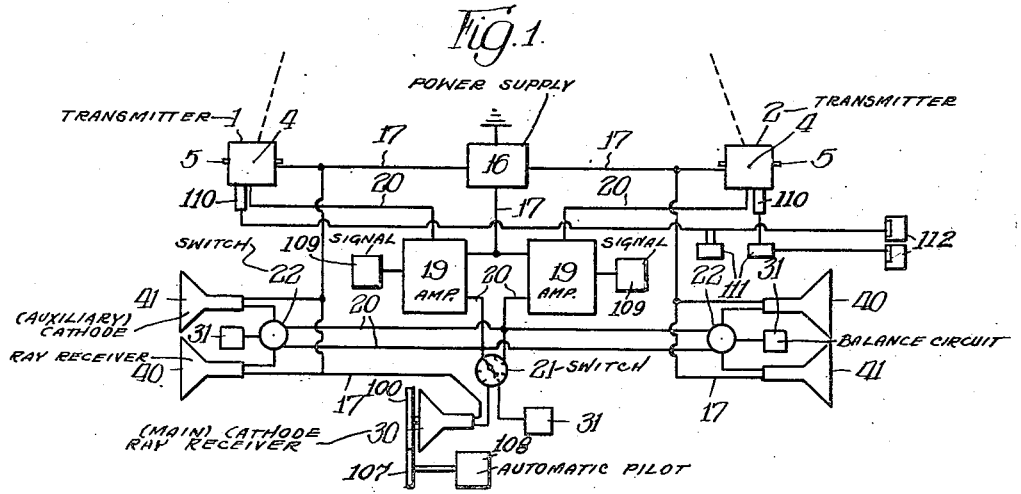

Inventor:
Herbert E. Jones,
By Richard Spencer
atty

Nov. 18, 1941.                H. E. JONES                2,262,942
                         NAVIGATION INSTRUMENT
                         Filed Feb. 28, 1938          5 Sheets-Sheet 4
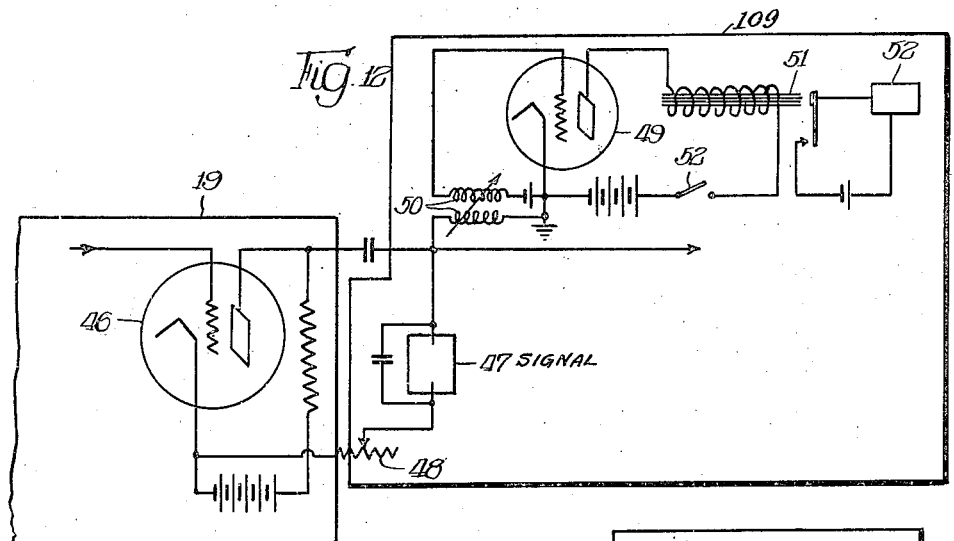
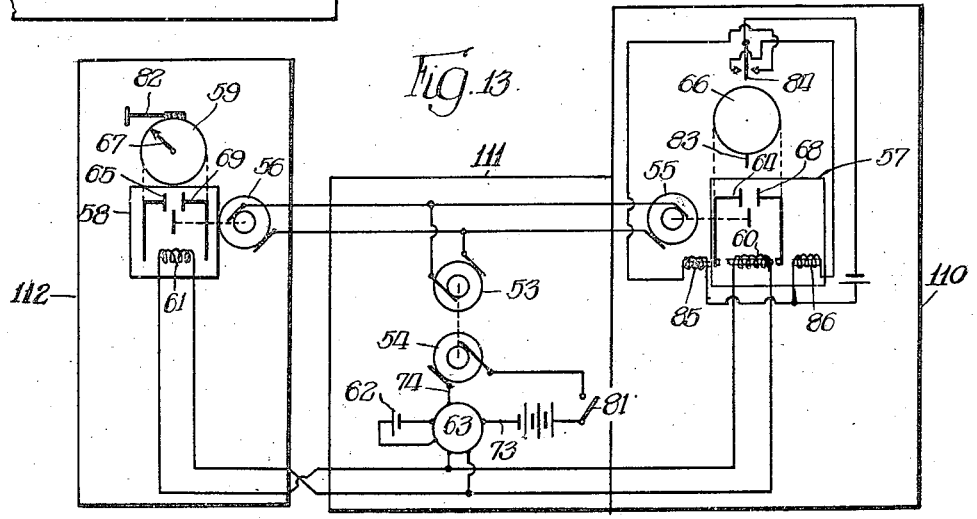
Inventor:
Herbert E. Jones,
By Richard Spencer
                atty.

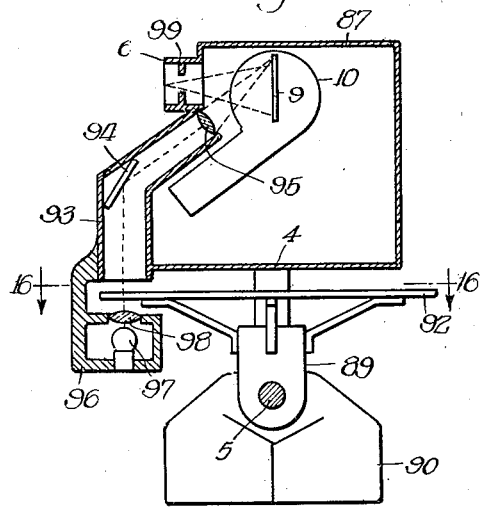

UNITED STATES PATENT OFFICE 2,262,942

NAVIGATION INSTRUMENT

Herbert E. Jones, Colorado Springs, Colo., assignor to Kansas City Testing Laboratory, Kansas City, Mo., a corporation of Missouri Application February 28, 1938, Serial No. 193,216

10 Claims. (Cl. 33—66)

This invention relates to improvements in television instruments and more particularly to improved television instruments for distance and direction finding, especially suitable for use in marine and aerial navigation.

One of the objects of the invention is to provide a new and improved method for determining the distance of an object from an observer or the point of observation, even though the object is invisible to the naked eye due to haze, mist, fog, smoke and other vapors and suspended particles that cause a lack of transparency to the atmosphere.

A further object is to provide a new and improved method for directly determining the direction of an object which would be normally visible but is obscured because of haze, mist, fog, smoke and the like.

An additional object is the provision of an aerial navigation instrument which can be used to determine absolute elevation above the ground even though the latter is rendered invisible to the observer due to haze, fog, smoke or the like, and to enable bombing planes to fly in cloudy weather or above the clouds and still see and fire effectively on their objectives.

An additional object is to provide a new and improved instrument in army and naval warfare which will penetrate smoke screens and enable gunners to determine the range of targets and observe the fire of their own guns on land or sea or in connection with anti-aircraft guns to determine the range and effect of fire on enemy aircraft obscured by fog, clouds, smoke and the like.

Still a further object of the present invention is to provide a direction and distance finding instrument which enables an object to be viewed at several different remote points at the same time by several observers.

Another object of the invention is to provide an instrument by which the aerial pilot or navigator, or both, can measure the angle of drift of an airplane quickly and easily and by connections with the automatic pilot very quickly adjust the automatic pilot for the observed drift.

Another object is to provide a navigation instrument for use on an airplane or airship by means of which a signal is automatically given when an object appears within the range of said instrument, even though the object is obscured by fog, mist, smoke, clouds or other atmospheric conditions.

Still a further object of the present invention is to provide a new and improved television instrument in which the reception from several different fields of view from a plurality of television transmitters are combined in a single field such that they coincide when the transmitters are focused on the same object.

Other objects and advantages of the invention will be apparent from the following description thereof.

In accomplishing these objects in accordance with this invention, two or more cathode ray transmitting tubes placed at some known and fixed distance apart are interconnected with one or more cathode ray oscillograph receiving stations. These transmitters are provided with means which allow them to be rotated or moved in either a horizontal plane or a vertical plane or both and thereby focused on a given object. Each transmitter contains a photo-electric screen, an electron gun and deflecting means for said electron gun as hereinafter more fully described. Furthermore, in accordance with this invention, each transmitter is preferably provided with a filter which passes substantially infra-red rays only. Each transmitter is also provided with means for focusing an image on the photo-electric screen. The cathode ray receiving tube or tubes contains an electron gun, a fluorescent screen and deflecting means. The transmitters and receiving tube, or tubes, are all connected, preferably having a common source of potential. Electrical connections from the screens of the transmitter tube connect with the electron guns of the receiving tubes and thus electrical impulses set up on the screens of the transmitting tubes by radiations from an object are translated, preferably after being amplified, to the electron beam of the receiving tube, or tubes, and serve to modulate said beam. The deflecting plates in the transmitting and receiving tubes are electrically connected and synchronized, whereby as the electron gun of the transmitting tube scans the photoelectric screen thereof, the electron gun of the receiving tube similarly scans the fluorescent screen thereof.

The range of a distant object can readily be determined by focusing two transmitters, a substantial distance apart, on the object and measuring the angle at each transmitter that the object makes with the fixed base line joining the two transmitters. Knowing these two angles and the distance between the transmitters, the distance of the object from either transmitter can readily be computed by the ordinary methods of trigonometry. To be sure that the two transmitters are focused on the same object and to save space and equipment, the image formed at each transmitter is translated by the electrical means described above to a single receiver, as described in more detail later. This receiver will then show two images, one from each transmitter, superimposed on each other. When the two images are brought into correspondence by moving one or both transmitters the two transmitters will be accurately pointing to the same object. The angles between the object and some fixed base line can be read directly as hereinafter more fully described.

In practising the present invention, means are also provided for disconnecting the transmitters from the receiver, or receivers, and signalling means are provided such that when an object comes into view of a transmitter, even though disconnected, an alarm or signal will call this to the attention of the operator. In the construction of the apparatus, a balance circuit is provided for the receivers when disconnected from the transmitters.

According to one modification of the invention, means are provided for having the angle an object makes with some fixed base line appear directly with the image of the object in the receiver. According to another modification, means are provided for automatically adjusting the automatic pilot used in airplanes for the drift correction by means associated with the cathode ray receiving tube as hereinafter more fully described.

The invention will be further illustrated by the following description in conjunction with the accompanying drawings in which:

Fig. 1 represents diagrammatically a television instrument of the type hereinafter more fully described having a plurality of transmitters interconnected with one or more receivers and adapted for distance and direction finding in aerial and marine navigation and for other purposes;

Fig. 2 represents diagrammatically the general principles involved in determining the distance of an object;

Fig. 3 represents diagrammatically in detail a cathode transmitting tube for iconoscope;

Fig. 4 represents diagrammatically in detail a cathode receiving tube or oscillograph such as is used in a television receiving system;

Fig. 12 illustrates diagrammatically an automatic signalling device adapted to be used in association with a transmitter to give a warning signal when an object comes within the range of the transmitter;

Fig. 13 illustrates remote control means for measuring the angle of rotation of the transmitters;

Fig. 14 illustrates diagrammatically the manual control switch 63 of Fig. 13;

Figure 15 illustrates diagrammatically a means for recording the angle an object makes with some fixed base line directly on the image of the object in the receiving tube;

Fig. 16 is a section along the line 16—16 of Fig. 15;

Fig. 17 illustrates means for adjusting the automatic pilot for drift when the angle of drift is being measured from the image in the receiving tube.

Figure 5:
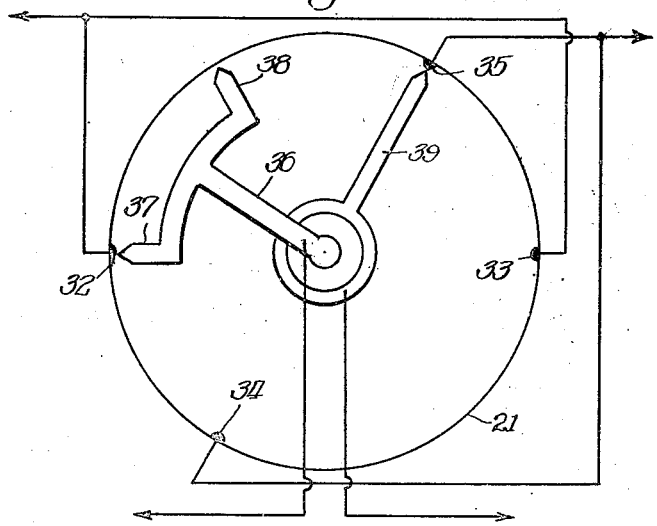
Fig. 5 illustrates switch 21 of Fig. 1, which provides means for connecting either one or both of the transmitters to the receiver.

In Figs. 1 and 2, the two transmitters 1 and 2 are placed at some known and fixed distance apart and have means located at each transmitter which permit the transmitter to be rotated in either a horizontal plane or a vertical plane, or both. By focusing both transmitters on an object such as 3, Fig. 2, and by measuring the angles 2, 1, 3, shown as $\alpha$ and 1, 2, 3, shown as $\beta$, and knowing the distance between the transmitter 1 and transmitter 2, shown as $\gamma$, the distance of object 3 can readily be calculated. This generally illustrates the principles upon which the instrument works as a range finder.

Referring to Fig. 1, transmitters 1 and 2 are supported in such a manner that they can be rotated in a horizontal plane about vertical pivots 4, 4 or rotated in a vertical plane about horizontal pivots 5, 5. The transmitters are then turned in such a position that they are both focused on the desired object.

The two transmitters 1 and 2 of Fig. 1 are shown in detail in Fig. 3. As illustrated, an image of the object is formed on a photo-electric sensitive plate by means of an optical system 6, containing a filter 7 and a lens 8. The filter 7 is practically transparent to infra-red radiation only. Plate 9 is enclosed in an iconoscope tube 10 and is made of some insulating material such as mica and having a silver or platinum backing 11. On the face of plate 9 is a plurality of photo-sensitive elements uniformly distributed over the plate. These elements are some photo-electric sensitized material which is especially sensitive to infra-red radiation such as caesium oxide sensitized by special process. Each element acts as a tiny photo cell which forms a condenser with the backing 11. As light falls on these elements a charge is built up proportional to the light intensity of the image at that point and is discharged in succession by a cathode ray beam 12.

Plate 9 is scanned by the cathode beam 12 by means of alternating current supplied to deflecting plates 13, 13 and 14, 14. The cathode beam is developed by an electron gun 15. Power is supplied to the cathode and the anode of the cathode gun 15 of each transmitter from a power supply 16 (shown in Fig. 1), which also contains generators supplying a common source of potential to actuate the sweep circuits for the deflecting plates 13, 13 and 14, 14 of each transmitter. The power circuit and sweep circuits are supplied to all tubes from power source 16 by connecting cable 17.

As cathode beam 12 scans the plate 9 (Fig. 3) point by point it causes current impulses or the signal current to be impressed in the grid circuit of an amplifying tube 18. The drawing shows but one amplifying tube though more may be used as necessary. This tube 18 supplies but the first stage of amplification. The signal circuit leaves the plate of tube 18 and is connected to a second stage of amplification 19 through a connection 20.

Fig. 1 shows how the two transmitters 1 and 2 are supplied with power and sweep circuits from power source 16 by cables 17 and shows the signal circuit 20 from both transmitters which include a primary stage of amplification 18 (Fig. 3), connected to a final stage of amplification 19. From this final stage of amplification the signal circuit is connected with various receivers 10 through switches 21 and 22, 22.

A detailed diagrammatic drawing of the receiver is shown in Fig. 4. The tube 23 is the ordinary type of cathode ray oscillograph tube used in television reception. Cathode beam 24 of this tube passes through a control grid 25 and is focused by the action of anode 26 on the fluorescent screen 27 composed of material that will give off light when subject to cathode ray bombardment, the intensity of this fluorescent spot being proportional to the intensity of the cathode beam 24.

The cathode beam 24 is caused to scan the fluorescent screen by deflecting plates 28, 28 and 29, 29. Since the deflecting plates 28, 28 and 29, 29 are supplied by the same sweep circuits that supply transmitters 1 and 2 from sweep circuit generator in power source 16, the position of cathode beam 24 will be in correspondence with cathode beam 12 in the transmitting tube. The intensity of the cathode beam 24 is controlled by the control grid 25 on which is impressed the signal voltage. This signal voltage will vary with the intensity of the light on plate 9 of the transmitter (Fig. 3). Therefore, the intensity of the cathode beam 24, at any instant, is proportional to the light intensity on the particular point on plate 9 that is covered by cathode beam 12, and since the two cathode beams 12 (Fig. 3) and 24 (Fig. 4) scan their respective screens in synchronism, the brightness of any particular point on screen 27 (Fig. 4) will vary in accordance with the intensity of light on the corresponding point on plate 9 (Fig. 3).

The switch 21 is so constructed that the single receiver 30 can receive the image from transmitter 1 or transmitter 2 or both at the same time. The switch also connects the transmitter that is not connected to the receiver to a balance circuit 31.

The switch 21 is shown in detail in Fig. 5. It is an ordinary type of spring switch with four contacts. Contacts 32 and 33 are connected to transmitter 1, contacts 34 and 35 being connected to transmitter 2. Measuring counterclockwise from contact 33, contact 33 is at zero degrees, contact 35 at sixty degrees, contact 32 at 180 degrees, contact 34 at 240 degrees.

Connections are made through contactor 36 having two contact points 37 and 38 with an angle of 60 degrees between them. Contactor 39 is a fixed angle of 60 degrees from contact point 38 and is insulated from contactor 36. Contactor 36 is connected to receiver 30 and contactor 39 is connected to balance circuit 31. Both contactors pivot about the center point. In this manner when either one of the transmitters 1 or 2 is connected to receiver 30 the other transmitter is connected to balance circuit 31. When contact pointers 37 and 38 are in contact with contacts 35 and 33 respectively or 34 and 32 respectively, the balance circuit is open, and both transmitters are connected to receiver 30.

Figure 6:
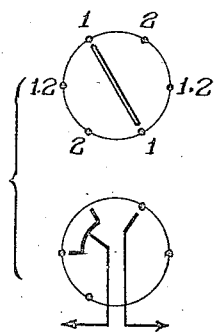
Figs. 6, 7 and 8 represent various positions of the elements of the switch shown in Fig. 5 and also illustrates the wiring diagrams for said switch.
Figure 7:
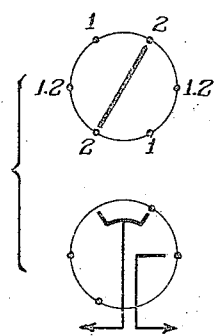
Figure 8:
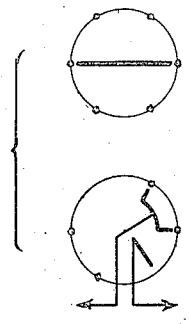

In Fig. 6, the top diagram shows the switch cover with switch in position 1, indicating that transmitter 1 is connected to the receiver 30. The lower diagram shows the wiring connections in this position. Fig. 7 shows position of switch with transmitter 2 connected to receiver 30 and Fig. 8 shows position when both transmitters are connected to receiver 30. The switch can be continued in a clockwise or counterclockwise direction in a full 360 degree turn. It is to be noted that any new position can be switched on from any old position directly without going through any other position. This has the advantage of using a single switch which saves space and time of operation.

Figure 9:
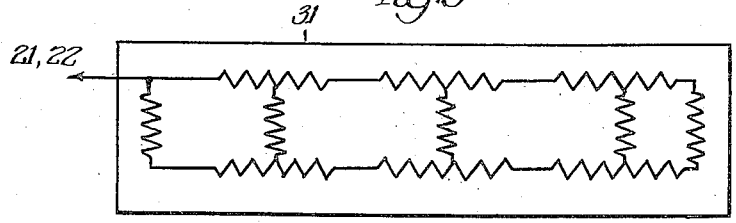
Fig. 9 illustrates diagrammatically a balance circuit employed in association with switches 21 and 22.

The balance circuit 31, illustrated diagrammatically in Fig. 9, is a circuit whose impedance matches that of the receivers 30, 40, 40 and 41, 41 and is placed in the general circuit so that the load on the transmitter and the amplifiers will remain constant regardless of whether the transmitter is connected to a receiver or not. As illustrated, this circuit is connected to switches 21 and 22, 22 (Fig. 1).

Figure 10:
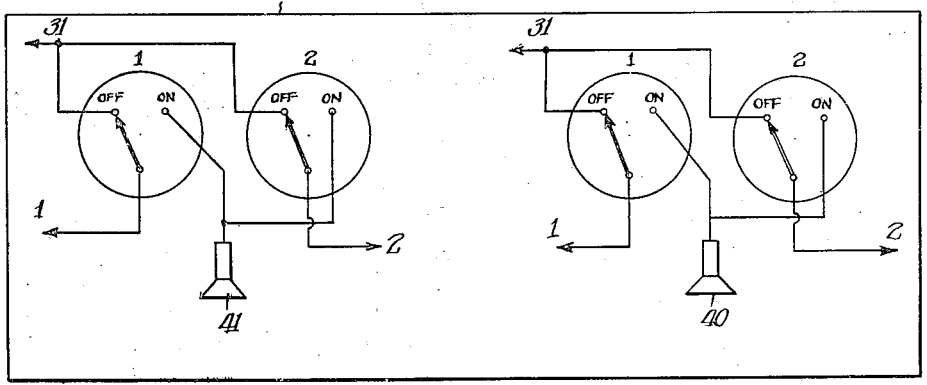
Fig. 10 illustrates diagrammatically the various positions of switches 22, 22.

Auxiliary receivers 40, 40 and 41, 41 are connected through simple switches 22, 22 such that either transmitter 1 or 2 may be connected to any receiver or both transmitters connected to any receiver. The transmitter that is not connected with a receiver is connected to balance circuit 31. These connections are shown in Fig. 10. Four simple two-way spring switches are shown as 22 with an "off" and "on" position. Two of the double switches are connected to transmitter 1, the other to transmitter 2. When switch is in off-position, the transmitter is connected to balance circuit, when switch is on, the transmitter is connected to a receiver.

By means of these switches the signal current from both transmitters 1 and 2 can be impressed on the control grid of a single receiver at the same time. Since the sweep circuits of transmitters 1 and 2 and the receiver are all in synchronization since they are supplied from a common source in 16, two superimposed images will appear on the screen of the receiver. If the two transmitters are directed at different objects, the superimposed images would tend to obliterate each other, but if the two transmitters are directed toward the same object, the images will be very nearly the same, and as the two images are brought into coincidence by moving either one or both of the transmitters, a single image will be formed, the intensity of which will be practically doubled. Moving either transmitter 1 or transmitter 2 such that the two images on the receiver will coincide will indicate that both transmitters are focused on the same object and then by measuring the angles of each transmitter from some base line and knowing the distance between transmitters, the distance of the object can quickly be determined.

By using a single receiver in this manner, a great deal of space is saved which is at great premium in aviation.

Figure 11:
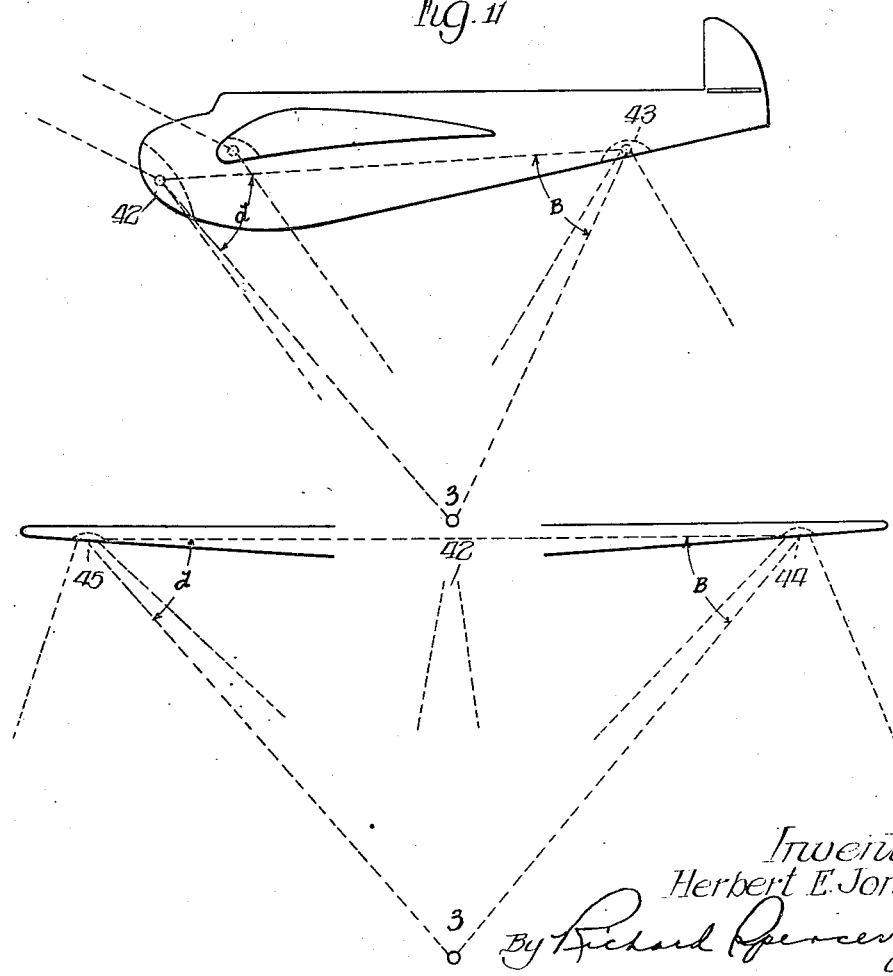
Figure 11 illustrates diagrammatically positions of transmitter tubes in various portions of an aircraft and indicates the various angles that need to be measured for computing the elevation of the aircraft above ground.

In air navigation, there may be several transmitters located at various points in the plane. For determining the absolute elevation above ground, the transmitters may be placed, one in the forward point of the fuselage and one in the rear, or one may be placed at the further extremities of the wings. The transmitter placed in the forward point of the fuselage may be so placed as to give a view straight ahead or downward. These locations are shown in Fig. 11. The transmitter in the bow is shown at point 42, the transmitter in the stern at point 43 and in the wings at points 44 and 45. The transmitters 42 and 43 can be directed toward an object 3, on the surface of the ground, and angles a and B measured as hereinafter more fully described, and since the distance between transmitters 42 and 43 is known, the elevation of the aircraft above object 3 can quickly be determined. Since object 3 is on the surface of the ground, this gives the height of the aircraft above ground. Another modification is shown in the lower diagram of Figure 11 in which the transmitters are placed towards the ends of the wings and rotate about a horizontal axis so as to focus on object 3. The angles a and B are measured and with the distance between transmitters 44 and 45 known, the height above object 3 can readily be determined. Naturally other transmitters may be placed in other strategic positions as desired. As was explained above, the transmitters are so constructed that they may be turned in various directions and the limits of their field of view are approximately shown by the dotted lines extending from each transmitter.

On ships and boats these transmitters may be placed at many points, such as the extreme ends of the bridge, high up on the mast, and in the stern. In submarines a transmitter may be placed in the periscope or swung out of the way when not needed.

In all cases, however, there will be several transmitters and there is no need for a separate receiver for each transmitter. It is, therefore, desirable to be able to indicate when an object comes into the field of view of one of the transmitters when the transmitter is not connected to the receiver. This is accomplished by the use of a signal light or a signal bell, or both, which will indicate the presence of an object in the field of view of the transmitter. This principle may be used for an anti-aircraft finder in fog.

This signal 109 (Figure 1) is shown in detail in Figure 12. When the transmitter is directed into fog too dense to penetrate very far, or directed toward a point in a cloudless sky, such that there is no appreciable variation in the light intensity within the field of view of the transmitter, the signal current from the transmitter will fluctuate very little. But when an object comes within the field of view of the transmitter, very definite changes in light intensity will occur which will cause wide fluctuations in the signal current output from the final amplifying tube 46 of the amplifier 19 (Figure 1). Sensitivity controls 48 and 50 are so adjusted that the signals 47 or 52 will not operate with the weak signal fluctuations produced when the light intensity is constant over the whole field of view of the transmitter.

Signal lamp 47 is a neon lamp which will light when there is an ample current produced in the plate circuit of tube 46. Resistor 48 is the adjustment to control the sensitivity of the signal 47. Therefore, when there is nothing in the field of view of the transmitter, there will not be sufficient current produced in the plate circuit of tube 46 to actuate signal lamp 47 and the lamp will not be lighted. But as soon as an object appears in the field of view of the transmitter, an ample fluctuating current will be produced in the plate circuit of tube 46, causing the signal lamp 47 to light, thus indicating to the observer that there is an object in the field of view of the transmitter.

If another form of signal is desired, a gas discharge tube, such as a thyratron, can be connected as shown. The grid of the thyratron tube 49 is connected to the signal circuit from the amplifier 46 through the variable transformer 50 and is so adjusted that no current flows in the plate circuit of 49 if there is no signal current in the grid circuit. As soon as a signal is received over the plate circuit of tube 46, it will excite the grid of the thyratron tube 49, causing a current in the plate circuit, and this plate circuit will continue to flow after the grid excitation is removed. The current in the plate circuit of tube 49 actuates relay 51 which closes a circuit in which there is placed, in series, a signal 52 which may be a bell or a light, or any kind of an electric signal requiring more power than can be supplied directly from the plate circuit of tube 46. The signal can be located at the receiver in the form of a photoelectric cell and activated relay. A push button or some other simple type of switch is provided in the plate circuit of tube 49, shown at 52. This switch is provided to open the plate circuit and reset the tube 49. With these signals an observer can be notified that an object has come within the field of view of any one of the transmitters.

The efficiency of the navigation instrument to measure the distance of an object depends upon the ability to measure the angle between some fixed base line and the object. The transmitter must not only be able to turn in any direction, but the direction through which the transmitter is turned must be measured at some remote point. This recording of the angle at some remote point is preferably accomplished by the use of two or more synchronous motors connected in parallel with a common source of alternating current. A diagrammatic showing of this feature is given in Fig. 13. A motor driven generator 53 is powered by a battery driven direct current motor 54. Generator 53 is an alternating current generator supplying current to the synchronous motors 55 and 56. Since the speed of the synchronous motors 55 and 56 depends on the number of cycles per second of the alternating current generated by 53, both motors 55 and 56 will run at exactly the same speed. Motor 55 is connected to gears through a magnetic clutch 57. These gears turn the transmitters. In the position shown in Fig. 13, the clutch is in a neutral position so that although the motor 55 may be running, the gears turning the transmitter are not meshed and, therefore, the transmitter will not turn. Motor 56 is connected to an indicating dial through a magnetic clutch 58 and is shown in a neutral position so there is no motion in the dial 59. The magnetic clutches 57 and 58 are actuated by magnetic coils 60 and 61, respectively, connected to a battery 62 through switch 63. In the position shown, the switch 63 is in such a position that the magnetic circuit is open. If switch 63 is closed by turning in a clockwise direction, gears 64 and 65 are meshed with motors 55 and 56, respectively. This causes the transmitter gear 66 to rotate in a clockwise direction, and an indicating dial 59 to also rotate in a clockwise direction. The ratio between gears 64 and 66 is the same as the ratio between gear 65 and dial 59 so that when gear 66 turns through a certain angle the indicating dial 59 turns through the same angle. The angle through which 59 has turned will be indicated by the indicator pointer 67.

When the switch 63 is again turned to a neutral position, gears 64 and 65 are pulled out of mesh with the motors 55 and 56 by spring action and the rotation of gears 66 and dial 59 stops. If the switch 63 is turned in a counterclockwise direction, gears 68 and 69 are meshed with motors 55 and 56, respectively, and gear 66 and dial 59 rotate in a counterclockwise direction. The angle turned at any instant from the start by gear 66 will be indicated by pointer 67.

The switch 63 is constructed as shown diagrammatically in Fig. 14. If the switch handle 70 is turned in a clockwise rotation, contacts 71 and 72, which are insulated from one another, are so connected to battery 62 that 71 is positive and 72 is negative, thereby actuating the magnetic clutches as described in the preceding paragraph. If the switch handle 70 is turned in a counterclockwise direction, the contacts 71 and 72 are so connected to battery 62 that 71 is negative and 72 is positive. This reverses the direction of the current in the coils 60 and 61 of the magnetic clutches and the clutch pulls in the opposite direction.

Switch 63 has another element which controls the speed of the motor generator 53—54. The leads of the motor generator are shown as 73 and 74 in Fig. 14. They are connected through a circular resistor 75 and a rotating arm 76. The rotating arm 76 is mechanically connected to the switch handle 70 in such a manner that when the handle 70 is in the position shown, arm 76 is in contact with a short section of resistor 75 which, for all practical purposes, has no resistance between points 77 and 78. These points 77 and 78 correspond to points 79 and 80 in the other portion of the switch. Therefore, as handle 70 turns such that the contacts 71 and 72 close the magnetic clutch circuits, arm 76 has rotated, but the total resistance in the motor generator circuit is unchanged. But as handle 70 turns further, contacts 71 and 72 continue to keep the magnetic circuit closed, but the effective resistance of the resistor 75 is decreased, which increases the speed of the motor generator 53—54 which in turn will increase the speeds of the synchronous motors 55 and 56. Since the arm 76 is always in contact with resistor 75, the generator motor circuit is closed and will always run at some speed depending on the resistance of 75. Switch 81 is the stop-start switch of the motor generator and is always left closed when the apparatus is in use.

Therefore, it will be seen that the transmitters can be turned at will through the control switch 63. As the control switch handle 70 is turned in any direction, gear 66 and dial 59 will turn in the same direction and the further the handle is turned, the faster will gear 66 and dial 59 rotate. The angle through which gear 66 has rotated will register at all times by the pointer 67. Although this diagram shows a rotation in a horizontal plane, the same apparatus will work for a rotation in a vertical plane or in fact, in any plane. If the transmitters are pivoted to turn in two directions, the control switch 63 can be so constructed that switch handle 70 can be moved upward and downward, as well as to the right or left and an upward or downward direction can be translated to an upward and downward movement of the transmitter.

Adjustment screw 82 is connected to dial 59 in such a manner that it is ordinarily not engaged with dial 59 but can be engaged by pressure on screw handle. When engaged it can turn dial 59 since the magnetic clutches are in a neutral position. This is to adjust pointer 67 for zero reading.

A safety device is also shown to prevent the transmitter from turning too far in one direction. An arm 83 extends from gear 66 in such a manner to come in contact with another arm 84. If gear 66 is turning in a clockwise direction, arm 83 will come in contact with arm 84, closing a circuit with magnetic coil 85 which opposes and is much stronger than the coil in the magnetic clutch. This will pull gear 64 out of mesh with motor 55 and stop 66 from rotating further. Since the magnetic clutch circuit is still closed, the switch 63 can be reversed, throwing gear 68 into mesh, reversing gear 66 and opening the circuit controlling coil 85. If the gear 66 is rotating in a counter-clockwise direction, the arm 83 comes in contact with 84, closing a circuit actuating magnetic coil 86, which opposes the coil of the magnetic clutch and pulls gear 68 out of mesh with motor 55. A similar apparatus is attached to dial 59 but is not shown here. The position of arm 83 is adjustable such that gear 66 can be stopped at any desired place and also to allow adjustment such that gear 66 and dial 59 will be stopped at exactly the same instant.

The above description illustrates how the angle between the object and some fixed base line can be determined and how this angle can be translated to an observer at a remote distance. It may also be desirable to have a close approximation to this angle by more direct means. This is accomplished by having this angle appear with the image of the object in the receiver.

In Fig. 15 there is illustrated a transmitter tube 10 inclosed in a case 87. This case 87 is supported on a vertical shaft 4 which is free to rotate in column 89, column 89 remaining fixed with regard to any rotation of case 87 in a horizontal plane. Column 89 is pivoted to a fixed base 90 by a horizontal shaft 5 allowing column 89, and consequently the case 87, to be moved upward or downward in a vertical plane.

Circular plate 92 is rigidly fixed to column 89 so it can move upward or downward around point 91 but is fixed with regard to any rotation of case 87 in a horizontal plane. Circle 92 is graduated to read the angle through which case 87 is rotated in a horizontal plane. The graduations are perforated in circle 92. Attached to case 87 is a tube 93, containing a mirror 94 and a lens 95. Attached to this tube is a fixture 96 containing a small source of light 97 and a condensing lens 98. Fixture 96 is so attached to the tube that the circle 92 is allowed to come in between the light 97 and the tube containing mirror 94 and lens 95. Since the figures designating the angle on circle 92 are perforated, the light from source 97 pours through the perforated figure, the light rays being corrected and made parallel by lens system 98, reflected by mirror 94 and refracted by lens system 95 in such a manner that an image of the figure on circle 92 is formed on plate 9 of the transmitter tube 10 (Fig. 3).

The lens system 95 is so adjusted that this image will appear in the upper part of plate 9 and be inverted, so that the method for the erection of the image described in my co-pending application bearing Serial No. 737,311, filed July 27, 1934, will give an erect image of this figure on the screen of the receiver. A mask 99 is placed in the optical system 6 of the transmitter so that portion of plate 9 on which the image of the figure of circle 92 is formed will not be covered by the general field of the optical system 6.

As case 87 is rotated in a horizontal plane, the different angles will appear above light 97, since circle 92 is fixed with regard to this rotation and an image of this angle will appear on plate 9 and be translated to the screen of the receiver, allowing observation of this angle.

Fig. 16 illustrates the direction finder of Fig. 15 along line 16—16 of Fig. 15.

In Fig. 17 is shown an auxiliary attachment to the navigation instrument by which a pilot in an airplane can adjust for drift or measure the angle of drift. Screen 27 of receiver 30 (Figs. 1 and 4) is surrounded by a ring 100. This ring 100 is so mounted that it can be rotated by thumbscrew 101 through a suitable gear 102. The ring has attached to it a number of parallel cross hairs or wires 103 and two widely separated cross hairs 104 and 105 at right angles to cross hairs 103. The ring is also graduated such that when the vernier 106 reads zero the cross hairs 103 are parallel to the longitudinal axis of the airplane.

Let us assume that the transmitter used in connection with the receiver is pointed directly downwards. If there is no drift the plane will be moving in the same direction as the longitudinal axis of the airplane and if the ring 100 is at zero angle, the images of the ground, appearing on screen 27, will drift across the screen, but all objects will drift parallel to the cross hairs.

If the plane is drifting due to an off course wind, the objects on the ground will not drift across the screen in a zero direction. The pilot can, however, turn the ring by means of thumbscrew 101 such that the drift of the objects on the ground across screen 27 will be parallel to cross hairs 103. The angle then shown at vernier 106 will indicate the angle of drift.

Ring 100 can be connected to gear 107 which is in turn connected to the regular automatic pilot 108 in such a manner that when ring 100 is turned, gear 107 turns and changes the course of the automatic pilot 108 by the same angle as ring 100 but in the opposite direction. This will tend to compensate the course of the airplane for the observed drift. The true angle of compensation is not, however, exactly equal to the observed angle before compensation, so when the new course is obtained, the objects on the ground will not drift parallel to the cross wires 103, but the error will be much smaller than before. So the ring is again turned such that the objects are drifting across the field parallel to cross wires 103. This in turn adjusts the automatic pilot 108 which will turn the airplane to a new angle of compensation. The cross hairs are again adjusted, the process being repeated until the objects on the ground are drifting across the screen parallel to the cross hairs after the automatic pilot has taken control. This indicates that the course of the plane is corrected for the observed drift.

After correcting for drift, the time an object on the ground takes to pass from cross hair 104 to 105 can be determined by a stop watch and by knowing the exact altitude above ground, the actual ground speed can quickly be determined as well as the direction of the wind and the wind velocity.

It will be apparent that by the use of the apparatus described in the present invention many observations and measures necessary to marine and aerial navigation can be made under atmospheric conditions that would make such measurements and observations impossible by ordinary means. The apparatus enables an observer to observe an object even though obscured by haze, fog, mist, smoke or the like and enables him to determine the distance and direction of such object. This is made possible by filtering out substantially all but the infra-red radiations. In ordinary shipping the instrument herein described increases safe allowable speeds in fog. In naval warfare this apparatus will penetrate smoke screens and enable gunners to determine the range of targets and observe the fire of their own guns. The use of infra-red radiations, furthermore, makes ordinary methods of camouflage useless, as the reflection of the infra-red light is far different from visible light. A further advantage of the apparatus herein described is that it enables the object to be observed at several different remote points at the same time by several observers. Thus, in marine navigation an object can be viewed and the distance and direction determined by various operators. For example, the object can be viewed by a seaman at the transmitter, by an officer on the bridge and in the captain's office. In airships and airplanes an image of the object can be formed on the control board for the pilot and in the navigator's compartment. Furthermore, the invention enables the pilot or navigator, or both, to measure the angle of drift of an airplane and to correct for drift by connections with the automatic pilot. The apparatus is so designed that if an object appears in the field of any one of the transmitters, a signal is instantly given showing the approximate location of the object. The transmitters can be so located as to give an unobstructed view in all directions, thus enabling an aviator to pick out landing fields otherwise obscured by fogs or mist and to make a landing under visual control.

It will be recognized that changes and variations may be made in the apparatus described without departing from the invention. For some purposes the apparatus may be advantageously employed under atmospheric conditions where there is no obscurity due to fog, smoke and the like, and to this end the infra-red filter may be made removable.

Another modification of the apparatus comprises the grouping of two or more cathode ray transmitting tubes, which act as receivers of the image, as compactly as possible and having their signal circuits connected in parallel to a single or the same amplifier in the amplifying system and thence to a single receiver. This arrangement will increase the strength of the signal current by approximately the proportion of the number of tubes used in parallel to the old method of using one tube. This amplification of the signal system will therefore increase clearness of the image without increasing background blur. It will thus be apparent that the principle involving focusing a plurality of transmitters on one object with a single receiver may be used to increase the range and intensity of the instrument.

Other means may be provided for measuring the angles illustrated by the triangle of Fig. 2, and other variations may be made without departing from the invention.

Having thus described the invention, what I claim as new and desire to secure by Letters Patent of the United States is:

1. A direction and range finding instrument comprising, in combination, a plurality of cathode ray transmitting tubes located at fixed stations a substantial distance apart, each of said tubes having a photo-electric mosaic screen, an electron gun, deflecting means, means for forming an image of an object on said screen and means for moving said transmitting tubes around fixed axes, at least a plurality of cathode ray receiving tubes each having an electron gun, a fluorescent screen, deflecting means, electrical connections between the screens of at least two transmitting tubes and the gun of at least one receiving tube for modulating the electron beam of the receiving tube, electrically synchronized means for deflecting the electron beams at the transmitting and receiving tubes, means for disconnecting one or more of the transmitting tubes from one or more of the receiving tubes, a signalling means adapted to give a warning when an object comes into view of a disconnected transmitting tube and a balance circuit to which receiving tubes are connected when not connected to a transmitting tube.

2. An instrument of the character described comprising, in combination, a plurality of cathode ray transmitting tubes at different stations in a vehicle, each tube having a photo-electric screen, an electron gun, deflecting means and means for forming an image of an object on said screen, a cathode ray receiving tube having an electron gun, a fluorescent screen and deflecting means, electrical connections between the screens of the transmitting tubes and the gun of the receiving tube for modulating the electron beam of the receiving tube, synchronized means for deflecting the electron beams at the transmitting and receiving tubes, means for disconnecting one or more of the transmitting tubes from the receiving tube and signalling means associated with disconnected transmitting tubes adapted to give a signal when an object appears within the view of one of the said disconnected transmitting tubes.

3. A navigation instrument for use in penetrating fog, haze and the like, comprising, in combination, a plurality of cathode ray transmitting tubes located at fixed stations a substantial distance apart, each having a photo-electric mosaic screen especially sensitive to infra-red radiation, an electron gun, deflecting means for said gun, a filter which passes substantially only infra-red rays from an object to said screen and a lens associated with said filter and said screen for focusing an image of an object on said screen, a cathode ray receiving tube having an electron gun, a fluorescent screen and deflecting means, electrical connections between the screen of the first tube and the gun of the second tube for modulating the electron beam of the second tube, common sources of potential for deflecting the electron beams at the transmitting tubes and the receiving tubes, electrical connections between the deflecting means at the receiving station and the common source of potential which cause an image to be formed at the receiving station, and means for focusing said transmitting tubes upon a distant object.

4. A direction and range finding instrument comprising, in combination, a plurality of cathode ray transmitting tubes located at fixed stations a substantial distance apart, each of said tubes having a photo-electric mosaic screen, an electron gun, detecting means, means for forming an image of an object on said screen and means for moving said transmitting tubes in any direction around fixed axes, at least one cathode ray receiving tube having an electron gun, a fluorescent screen and deflecting means, electrical connections between the screens of the transmitting tubes and the gun or guns of the receiving tube or tubes for modulating the electron beam of the receiving tube or tubes, synchronized means for deflecting the electron beam at the transmitting and receiving tubes, means in the transmitting tubes for filtering out all but the infra-red radiations from the object, means for disconnecting one or more of the transmitting tubes from the receiving tubes, a signalling means adapted to give a warning when an object comes into view of a disconnected transmitting tube, a balance circuit to which said receiving tubes are connected when said receiving tubes are not connected to a transmitting tube and means for causing the direction of an object to appear on the image in a receiving tube.

5. A direction and distance finding apparatus comprising, in combination, a plurality of cathode ray transmitting tubes located at fixed stations a substantial distance apart, each of said tubes having a photo-electric mosaic screen, an electron gun, deflecting means, means for forming an image of an object on said screen and means for moving said transmitting tubes in any direction around fixed axes, at least cathode ray receiving tubes having an electron gun, a fluorescent screen and deflecting means, electrical connections between the screens of the transmitting tubes and the gun of the receiving tube or tubes for modulating the electron beam of the receiving tube or tubes, synchronized means for deflecting the electron beams at the transmitting and receiving tubes, means in the transmitting tubes for filtering out all but infra-red radiations from the object, means for disconnecting one or more of the transmitting tubes from the receiving tubes, a signalling means adapted to give a warning when an object comes into view of a transmitting tube even though disconnected, a balance circuit to which receiving tubes are connected when not connected to a transmitting tube, means for causing the direction of an object to appear on the image in a receiving tube and means for focusing the transmitting tubes on a distant object and measuring the angles formed between the transmitting tubes and the object.

6. A direction and range finding instrument comprising, in combination, a plurality of cathode ray transmitting tubes located at fixed stations a substantial distance apart, each of said tubes having a photo-electric mosaic screen, an electron gun, deflecting means, means for forming an image of an object on said screen and means for moving said transmitting tubes in any direction around fixed axes, at least one cathode ray receiving tube having an electron gun, a fluorescent screen and deflecting means, electrical connections between the screens of the transmitting tubes and the gun of the receiving tube or tubes for modulating the electron beam of the receiving tube or tubes, synchronized means for deflecting the electron beams at the transmitting and receiving tubes, means in the transmitting tubes for filtering out all but the infra-red radiations from the object, means for disconnecting one or more of the transmitting tubes from the receiving tubes, a signalling means adapted to give a warning when an object comes into view of a transmitting tube even though the transmitting tube is disconnected, a cathode ray receiving tube, a balance circuit to which receiving tubes are connected when not connected to a transmitting tube, means for causing the direction of an object to appear on the image in a receiving tube and remote control means for focusing the transmitting tubes on a distant object and measuring the angle of rotation.

7. A navigation instrument of the character described comprising, in combination, a plurality of spaced iconoscopes, a photo-electric mosaic screen especially sensitive to infra-red radiation associated with each iconoscope, a lens associated with each iconoscope, means for focusing said iconoscopes upon any given object, means for converting any data received by the iconoscopes into a visible signal, and means for excluding from the lenses of the iconoscopes all rays excepting infra-red rays.

8. A navigation instrument of the character described comprising, in combination, a plurality of spaced iconoscopes, a photo-electric mosaic screen especially sensitive to infra-red radiation associated with each iconoscope, a lens associated with each iconoscope, means for focusing said iconoscopes upon any given object, means for converting any data received by the iconoscopes into a visible signal, and means for excluding from the lenses of the iconoscopes all rays excepting infra-red rays, said means comprising a filter mounted adjacent to the lens of each iconoscope.

9. A navigation instrument of the character described comprising, in combination, a plurality of spaced iconoscopes, a photo-electric mosaic screen containing material such as caesium oxide which is especially sensitive to infra-red radiation in association with each iconoscope, a lens associated with each iconoscope, means for focusing said iconoscopes upon any given object, means for converting any data received by the iconoscopes into a visible signal and means for excluding from the lenses of the iconoscopes all rays excepting infra-red rays, said means comprising a filter mounted adjacent to the lens of each iconoscope.

10. A direction and range finding instrument comprising, in combination, a plurality of cathode ray transmitting tubes located at fixed stations a substantial distance apart, each of said tubes having a photo-electric mosaic screen, an electron gun, deflecting means, means for forming an image of an object on said screen and means for focusing said transmitting tubes on a distant object moving relative to the transmitting tubes, a cathode ray receiving tube having an electron gun, a fluorescent screen for deflecting means, electrical connections between the screens of at least two transmitting tubes and a gun of the receiving tube for modulating the electron beam of the receiving tube and electrical connections between the deflecting means of the two transmitting tubes and the deflecting means of the receiving tube, whereby focusing and directing of the two transmitting tubes upon a single distant object will superpose images of the object one upon the other on the screen of the receiving tube with the result that measurement of the inclination of the two transmitting tubes to each other makes possible a determination of the distance of the object viewed by the tubes therefrom.

HERBERT E. JONES.

CERTIFICATE OF CORRECTION.

Patent No. 2,262,942. November 18, 1941.

HERBERT E. JONES.

It is hereby certified that error appears in the printed specification of the above numbered patent requiring correction as follows: Page 2, first column, line 47, for the word "for" read --or--; and line 70, after "warning" insert --or--; page 7, first column, line 73, claim 4, for "detecting" read --deflecting--; and second column, line 29, claim 5, after "least" insert --one--; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents.

CERTIFICATE OF CORRECTION.

Patent No. 2,262,942.  November 18, 1941.

HERBERT E. JONES.

It is hereby certified that error appears in the printed specification of the above numbered patent requiring correction as follows: Page 2, first column, line 47, for the word "for" read --or--; and line 70, after "warning" insert --or--; page 7, first column, line 73, claim 4, for "detecting" read --deflecting--; and second column, line 29, claim 5, after "least" insert --one--; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents.